(12) United States Patent
Govani et al.

(10) Patent No.: US 8,560,561 B2
(45) Date of Patent: Oct. 15, 2013

(54) LOCATION AWARE SEARCH PAGE ELEMENTS

(75) Inventors: Tabreez Govani, Bellevue, WA (US); Nikhil Dandekar, Seattle, WA (US); Gheorghe Muresan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 12/683,572

(22) Filed: Jan. 7, 2010

(65) Prior Publication Data

US 2011/0167077 A1    Jul. 7, 2011

(51) Int. Cl.
*G06F 17/30* (2006.01)

(52) U.S. Cl.
USPC ........................................... 707/767

(58) Field of Classification Search
USPC ........................................... 707/767
See application file for complete search history.

(56) References Cited

U.S. PATENT DOCUMENTS

| | | |
|---|---|---|
| 7,499,914 B2 | 3/2009 | Diab |
| 2004/0102197 A1 | 5/2004 | Dietz |
| 2007/0061302 A1 | 3/2007 | Ramer |
| 2008/0132251 A1 | 6/2008 | Altman |
| 2008/0256039 A1 | 10/2008 | Chang |

OTHER PUBLICATIONS

Goker, Mehmet H., et al., Workshop on Case Based Reasoning and Personalization, 6th European Conference on Case Based Reasoning ECCBR 2002, Sep. 4, 2002, 34 pp., Position Papers, Aberdeen, Scotland.

Kaasinen, Eija, User needs for location-aware mobile service, Pers Ubiquit Comput, 2003, 7:70-79, London.

Belz-Schmidt, Barbara, et al., Location-based mobile tourist services—first user experiences, Sankt Augustin, Germany, 2003, Information and Communication Technologies in Tourism, Andrew Frew, et al. (eds.) Springer Computer Science 2003.

*Primary Examiner* — Huawen Peng
(74) *Attorney, Agent, or Firm* — Shook, Hardy & Bacon LLP

(57) ABSTRACT

User locality information can be used to improve various aspects of search results pages. Queries can be suggested based on the user location while excluding common query suggestions that involve an unrelated geographic entity. Deeplinks can also be modified to include location based suggestions. Additionally, results for specialized searches such as travel searches can be improved by employing user locality information.

8 Claims, 10 Drawing Sheets weather

405

<Link to Weather Site> (412)

<Deeplink> (442)    <Deeplink> (442)

<Deeplink> (442)    <Deeplink> (442)

Weather NYC (444)

*FIG. 4a* weather

405

<Link to Weather Site> (412)

| | |
|---|---|
| Weather Carlsbad CA (446) | <Deeplink> (442) |
| Weather San Diego (447) | <Deeplink> (442) |
| <Deeplink> (442) | <Deeplink> (442) |

*FIG. 4b*

LOCATION AWARE SEARCH PAGE ELEMENTS

BACKGROUND

One of the difficulties associated with keyword searching is providing context sensitive results. A search query based on several keywords can often result in thousands or even millions of potentially matching documents. Ideally, adding context to a keyword search can lead to more highly relevant documents being displayed closer to the top of the list of matching documents.

One type of context that can be used in keyword searching is location based context. Some search queries can explicitly identify a locality, such as "Seattle weather". However, location based context can also be provided implicitly, such as by detecting and/or inferring a location for a user when a search query is potentially sensitive to location. Using such implicit location information, a query for "weather" can still generate results for "Seattle weather" based on information such as the location of the user's internet access or information from a user profile.

SUMMARY

In an embodiment, user locality information can be used to improve various aspects of search results pages. Queries can be suggested based on the user location while excluding common query suggestions that involve an unrelated geographic entity. Deeplinks can also be modified to include location based suggestions. Additionally, results for specialized searches such as travel searches can be improved by employing user locality information.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein:

FIGS. 4a and 4b schematically show portions of a search results page.

DETAILED DESCRIPTION

Overview

Figure 1:
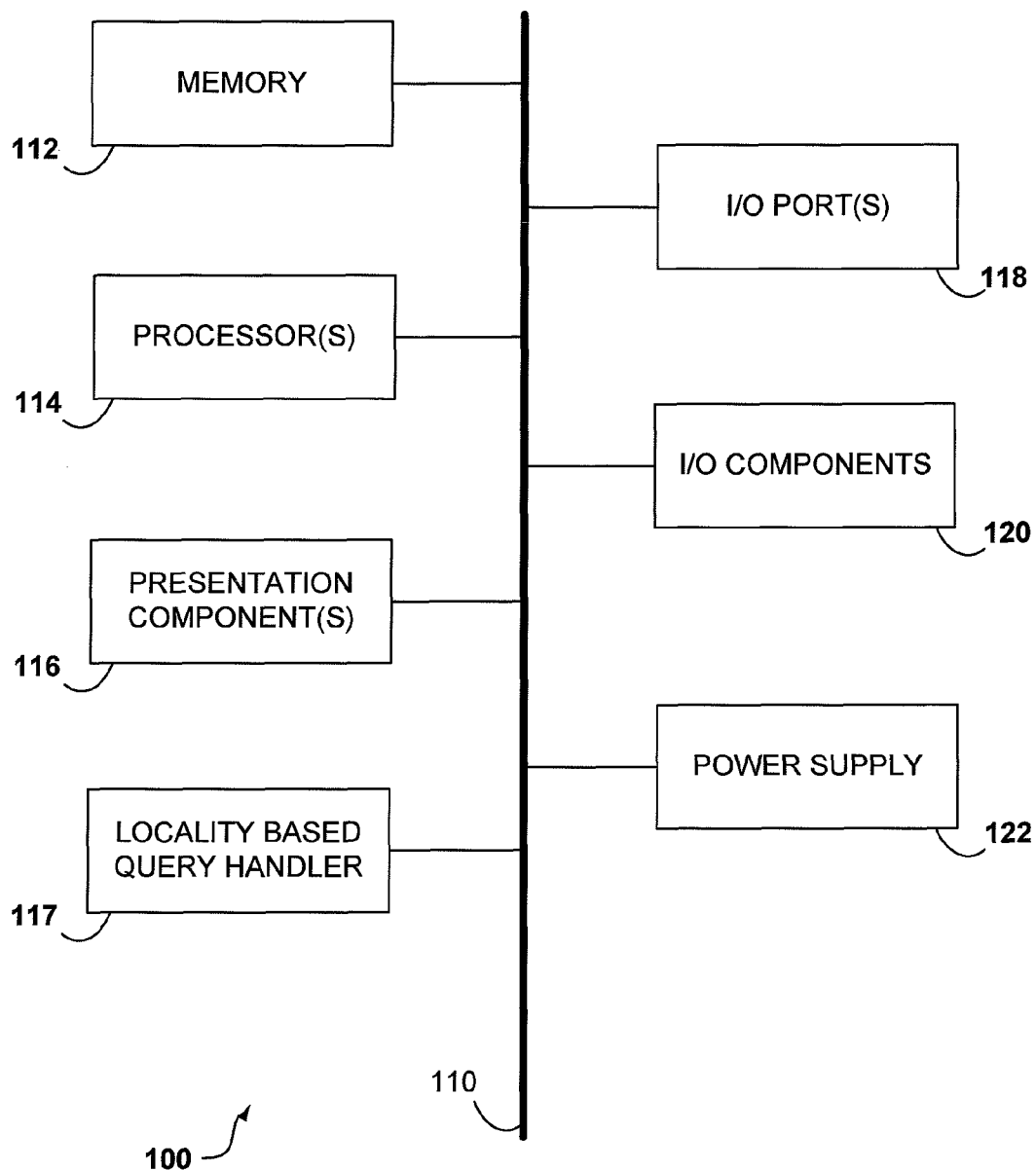
FIG. 1 is a block diagram of an exemplary computing environment suitable for use in implementing embodiments of the present invention.

In various embodiments, methods are provided for improving the page elements presented to a user in response to a search query. In response to a search query, a user can be provided with document links that are responsive to the query, including any implicit location information. However, a number of other types of items can be provided in connection with the responsive document links, and in various embodiments one or more of these related items can be improved by using location based context.

In an embodiment, a user can be provided with suggestions for related searches as part of the response to a search query. Such related search suggestions can be provided to a user in a manner that incorporates the location context of the search query. As another example, some search result listings can include multiple documents that are responsive to a search query and that are located within a single domain. These multiple documents can be provided as "deeplinks", or links that are shown as secondary documents underneath the document corresponding to the higher level domain. In an embodiment, the deeplinks presented in response to a search query can be enhanced based on the location context of the search query. In still another embodiment, some search queries are directed to search engines with a specific relationship to a locality. For example, a search query submitted to a travel site based on a city has an implication that the user is interested from traveling from a current location to that city. Location context can be used to provide a user with a desired answer based on an abbreviated search query.

Query Suggestion and/or Related Searches

When a user submits a query, one type of supplemental information that can be useful to a user is an indication of other queries that may be of interest. These related searches, query suggestions, and/or webgroup suggestions can provide a user with a more focused search that may be relevant to the user's interests.

Related searches can be identified based on identifying submission of search requests that appear to be related. For example, historical data from search query data logs may show that the search query "bus" is often followed closely by a search query of "bus <location>" or "<location> bus". In this situation, queries can be close in terms of time of submission, in terms of being submitted consecutively, or the queries can be close based on another standard that indicates that the queries are related. Independent of the exact method for identifying the related queries, the log data can be used to identify terms that are implicitly local, such as queries related to traffic, pizza, museums, or transportation (e.g., bus, taxi).

When a query is determined to have implicit local content, the related searches or query suggestions provided in response to the query can be modified to reflect the implicit local nature of the query. One type of modification is to add related searches based on the user's current local context. The user's current local context or locality can be determined in any convenient manner. In the embodiment, a lookup file can be used to store locations for various types of internet or web addresses that are origination points for the search query. Alternatively, a user's current location could be inferred based on other information, such as information from a user profile, an analysis of recent activity by the user, or another convenient method.

After determining the user's locality, related searches corresponding to the local context can be constructed. One suggested query that can be constructed corresponds to combining the initial query with the city corresponding to the local context. Thus, for a user located at an IP address corresponding to Redmond, Wash., a query of "bus" can lead to construction of a related search of "bus Redmond". Alternatively, some city names may not be sufficiently unique. For example, Portland can refer to a city in both Oregon and Maine. A lookup table or service can be used to determine whether a city name is unique, or whether a city name may be ambiguous due to presence in more than one state or country. If the city name alone is potentially ambiguous, a related search including both the city and state can be suggested. Thus, in the example above, a related search of "bus Redmond Washington" could be suggested.

In addition to suggesting a query based on the user's locality, related searches can also be suggested for nearby localities. For example, the latitude and longitude and/or the GPS coordinates and/or coordinates from another measurement system can be determined for the location of the user's local context. The coordinates can be for the city or town of the local context, the coordinates of the street address of the local context (if known), or coordinates based on another geographic measure. Based on the coordinates, other nearby cities, towns, counties, or other geographic designations can be identified. For example, the latitude and longitude for Redmond, Wash. indicates that it is near Seattle. Redmond is also within the boundaries of King County, Wash., and/or close to the coordinates defining the center of King county. Based on this coordinate comparison, a query for "bus" having a local context of Redmond, Wash. can lead to construction of query suggestions for "bus Seattle" and "bus King County, WA.".

In an embodiment, the above process for determining geographic locations that are close to each other can be performed ahead of time and the results stored in a lookup table. In such an embodiment, a list of cities, towns, counties, or other geographic entities can be determined. For each geographic entity, a listing of other geographic entities that are considered neighbors can be created. This provides the basis for a lookup table. Any convenient standard can be used for determining that a geographic entity is nearby. For example, one test can be to include any geographic entities within a certain radius, such as within 5 miles, or within 20 miles. Another criteria can be to include any overlapping geographic entity. For example, the center of a county could be a long distance from a town at the edge of a county even though the town is located within the borders of the county. Based on an overlap criteria, the county could be considered as a neighbor. Still another potential criteria is to include as a neighbor the nearest city with a population above a certain size. Of course, other criteria can be used to construct a neighbor list having desired characteristics.

When a user submits a query where local context may be useful for constructing related searches, the user's local context is determined. If the user's local context does not match a geographic entity from the lookup table, the user's coordinates can be used to perform a calculation that identifies the nearest geographic entity as a match. The matching geographic entity and the neighbor geographic entities from the lookup table can then be used to construct suggested queries.

In still another embodiment, the related searches provided in response to a query can also be modified to remove related searches that are not relevant for the user's local context. Methods for identifying related searches are typically not limited to related location searches, but also include any other searches that can be suggested based on past log data. However, this can lead to difficulties for queries with implicit local character. For example, a conventional method for determining related searches may determine that the query "traffic" should have related searches of "traffic Los Angeles" and "traffic Boston". Such an outcome would likely be an artifact of the fact that Los Angeles and Boston are relatively large cities, as opposed to these cities being of general interest.

In order to overcome this difficulty with related search suggestions, the user's local context can be used to remove related search suggestions that are location based but not relevant for the user's local context. In such an embodiment, related searches are determined when a query is submitted. The terms in the related searches are then analyzed to identify related searches that include a geographic entity that is either a) not relevant to the local context or b) not relevant to an explicit term from the original query. In an embodiment, the determination that a geographic entity is not relevant can be based on whether the geographic entity is considered a neighbor as described above. When the related searches are displayed to the user, these identified queries can be omitted.

By using combinations of the above embodiments, related searches or query suggestions can be provided to a user that take into account a user's local context. Starting with a conventional related search listing, the related searches can be supplemented by constructing related searches based on the user's geographic entity and any entities that are considered neighbors. Additionally, any related searches based on unrelated geographic entities can be removed from display.

Location Aware Deeplinks

In an embodiment, a user's local context can be used to improve the quality of "deeplinks" provided as part of the search results for a query. Deeplinks refer to targeted additional links that can be provided in association with a matching search result. One situation where deeplinks can be provided is when a user enters a query that is considered "navigational". A navigational query refers to a query where a user generally knows the web property and/or page and/or site that is desired, but does not know the specific address or uniform resource locator for the web site. In the discussion below, deeplinks will be discussed in relation to navigational queries, although deeplinks could be provided to a user as part of a response to other types of queries.

As an example of deeplinks, consider a situation where a user enters the query "Nordstrom". The top search result responsive to this query will likely be the website associated with the store of the same name. In addition to the top level domain for the store, a plurality of additional links and/or documents can be provided, such as women's apparel, online shoes, sale online, baby & kids, handbags & accessories, at home & gifts, and menswear online. These targeted links allow a user to quickly locate various types of information at the web site corresponding to the top matching search result. Conventionally, these targeted links, or deeplinks, can be provided based on various factors, such as based on the quality of match between the deeplink and the original query, or the overall popularity of the deeplink.

For some webpages, a user's local context will modify the portion of a webpage or domain that is of likely interest to a user. Web sites providing traffic information, weather information, local reviews of businesses, bartering sites, or personal ad sites are all examples of services where a person is likely to be interested in information for a specific location or geographic entity. Often, such web sites will have pages below the top level domain that correspond to a specific geographic entity, such as weather or traffic for a particular city.

In an embodiment, a user's local context can be used to improve the deeplinks provided in response to a search query. In such an embodiment, a user can submit a query that produces one or more search results that are considered suitable for providing deeplinks. The search engine can select to provide deeplinks for a result based on the query being considered navigational, or based on quality of the match of the result with the query, or based on the frequency of visits to the site corresponding to the result, or for any other convenient reason. After determining that deeplinks should be provided, the geographic entity corresponding to the user's local context is identified. A series of additional queries can then be constructed that incorporate the original query and either the geographic entity corresponding to the user's local context or a neighbor of the geographic entity. If the original query related to weather and the user's local context is Seattle, Wash., the additional constructed queries could include "weather Seattle" and "weather Redmond." Depending on the name of the geographic entity, the state may also be included, which could lead to an additional constructed query such as "weather Bellevue, WA.".

After constructing the additional queries, the additional queries can be compared with click log data (or other historical data) to determine the most frequently clicked pages or documents for each constructed query. These frequently clicked pages can be filtered to remove pages that are not part of the domain that matched the original query. The frequently clicked pages that are part of the domain that matched the original query can then be ranked using any convenient method. One example ranking method is to use a formula such as $$X_1*S+X_2*N+C$$

In the above formula, S refers to the number of same-city queries that match a page. For example, if a user's local context is Seattle, then a constructed query of "weather Seattle" would constitute a same-city query. A constructed query of "weather Bellevue, WA" that includes a neighbor city of Seattle would not constitute a same-city query. Instead, the "weather Bellevue, WA" query would be counted as part of N, which corresponds to the neighbor queries that match a given page. C in the above equation refers to the click-score for the page. $X_1$ and $X_2$ represent numerical constants that can be tuned to provide relevant URL's. For example, $X_1$ could be given a value of 100, while $X_2$ could be given a value of 10.

Based on the ranking formula, pages with a sufficiently high ranking score can then be provided as deeplinks. For example, a grocery store chain could have locations in many states within the United States. The types of items carried in the store could vary on a regional basis, resulting in a web site structure with separate pages for different regions or cities. Thus, a search result of http://www.<grocerystore>.com could have deeplinks of http://www.<grocerystore>.com/Seattle and/or http://www.<grocerystore>.com/northwest for a user with a locality in Seattle. In some embodiments, combinations of queries and locations can be searched in advance, and the deeplinks having a sufficiently high ranking for a given query and location can be stored. In such embodiments, the appropriate deeplinks based on local context can be retrieved from the lookup table when a query is submitted. The deeplinks based on local context can be displayed with any other deeplinks for the site matching the original query, or the local context based deeplinks can be displayed in a separate area.

Optionally, a user's local context can be used to remove deeplinks that are of lesser interest. As described above for related searches, deeplinks involving a geographical entity can be analyzed, and deeplinks corresponding to a geographical entity different from the local context or a neighbor can be excluded. Thus, for the grocery store chain example mentioned above, deeplinks corresponding to http://www.<grocerystore>.com/SanDiego and http://www.<grocerystore>.com/NYC could be excluded for a user with a locality in Seattle.

Location Aware Travel Answer

In still another embodiment, a user's local context can be employed to improve results generated by a search engine that includes functionality for search specialized subject matter, such as a search engine for identifying airline flights. For example, a user living in Carlsbad, Calif. may be interested in flying to Boston. Such a user can visit a travel web site, and enter a query of "flight to Boston", "Boston flight deals", or even just "Boston". The user's local context of Carlsbad, Calif. can be used to improve the results provided by inferring the likely intent of a potential user travel request. Alternatively, such an inference can also be made for a query submitted to a general search engine that includes a travel search capability.

In an embodiment, the query submitted by the user is first analyzed to determine if a specialized search, such as a Travel search, is being requested. The query can be analyzed to determine if the query matches a defined format, such as "flight to <city>," "<city> flight deals," another type of format involving flight, plane, train, or bus in the query, or potentially just the query "<city>". The coordinates and/or the geographic entity for the user's local context is then determined. Based on the user's location, nearby cities with an appropriate travel hub can be identified, such as cities with airports. For a local context of Carlsbad, Calif., this could include San Diego, Calif. and Irvine, Calif. The nearest airport can then be identified based on distance. Note that in some alternative embodiments, other examples of travel hubs could include cities with train stations or bus depots.

The original query can be reformulated to include the identified nearest travel hub. In the example above, based on the query "flight to Boston", a replacement query could be constructed as "San Diego to Boston". This replacement query could then be submitted to the travel search engine to identify appropriate flight options. In an embodiment, the search engine can be a search engine that provides both general and specialized results. In such an embodiment, the flight options generated by the constructed query can be displayed of the results matching the original query, or the flight options can be displayed in a separate area.

General Computing Environment

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. FIG. 1 further shows a locality based query handler component 117 according to an embodiment of the invention. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100. In another embodiment, the computer storage media can be a tangible computer storage media. In still another embodiment, the computer storage media can be non-transitory computer storage media.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Identifying and Handling Implicit Local Queries

Figure 2:
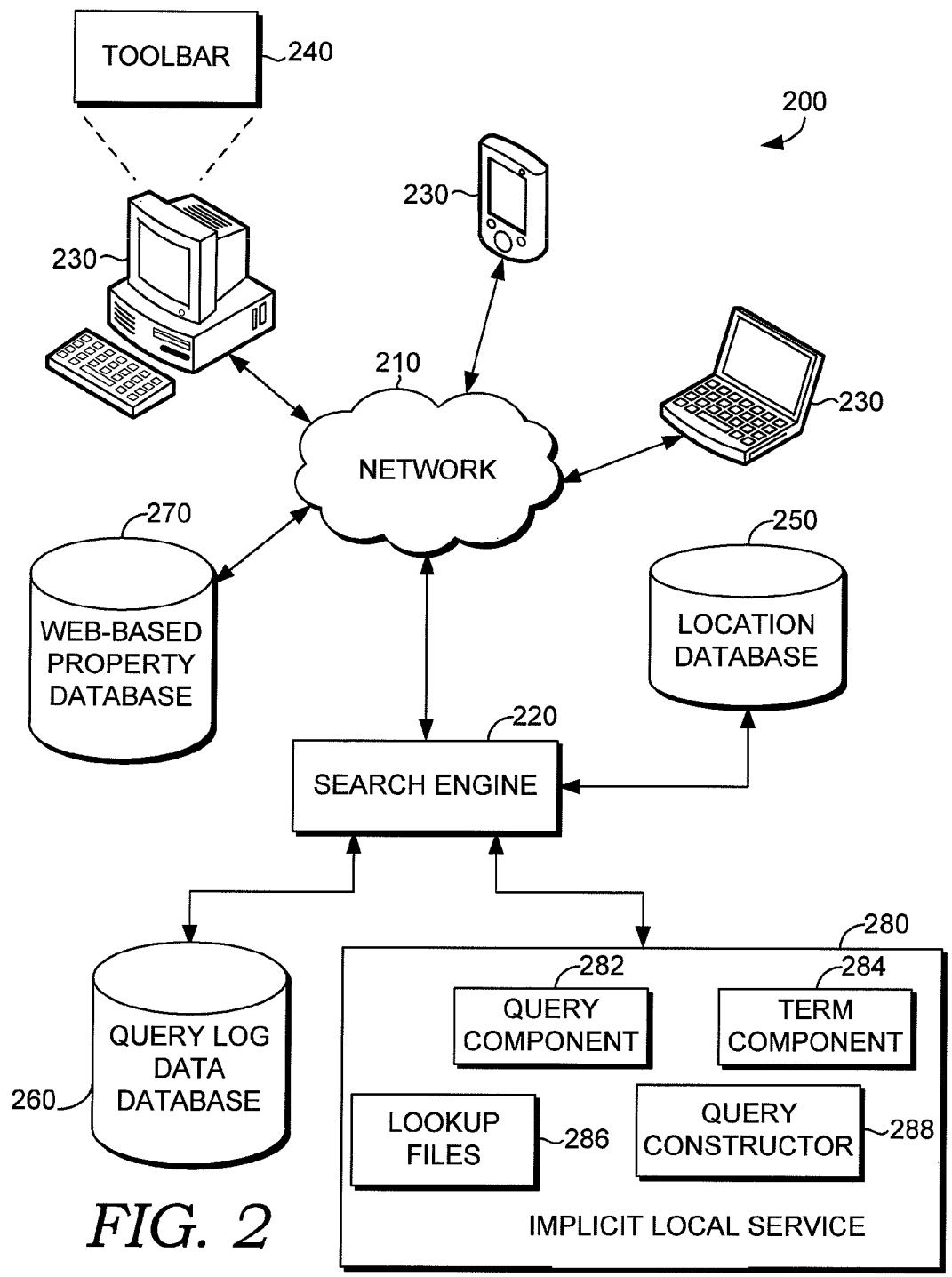
FIG. 2 schematically shows an example of a system for performing some embodiments of the invention.

FIG. 2 shows an example of a system that can assist in handling implicit local queries, or queries where relevance of search results can be improved by biasing the results based on a locality. In the example of an implicit query system shown in FIG. 2, the operating environment 200 includes a network 210, a search engine 220, a plurality of client devices 230 (which may be, for instance, computing device 100 of FIG. 1), a location database 250, a query log data database 260, a web-based property database 270, and an implicit local service 280.

Generally, search queries that include an implicit local context can be used with any suitable search engine designed for searching a network. The network can be a local network, a private network, or a publicly accessible network such as the Internet. Some examples below may make reference to searching for web sites, web documents, or "web-based properties." It is understood that the such examples can be readily adapted to searching of any other convenient network.

As used herein, "web-based properties" are documents that represent HyperText Markup Language pages or other content. Web-based properties may be addressed using Uniform Resource Locators (URLs) and may include anchors that link to other web-based properties or additional content. In an embodiment, the web-based properties may be formatted in extensible markup language or any other markup language. In other embodiments, network sites and/or documents may represent any suitable language for constructing a document or site available on a network, and such sites and/or documents may be addressed using any convenient addressing scheme.

In the embodiment shown in FIG. 2, the network 210 is configured to facilitate communication between the client devices 230 and the search engine 220. The network 210 may be a communication network, such as a wireless network, local area network, wired network, or the Internet. In an embodiment, the client devices 230 communicate search queries received from one of the plurality of client devices 230 to the search engine 220 utilizing the network 210. Similarly, in embodiments, the search engine 220 communicates search results satisfying a received search query to one or more of the plurality of client devices 230 via the network 210.

The search engine 220 is a computing device that receives user search queries, determines search results satisfying the user search queries received and transmits determined satisfying search results to the client devices 230 (e.g., utilizing network 210). In some embodiments, the search engine 220 is configured to execute on a server device. The search engine 220 may receive search queries input in association with at least one of the client devices 230 (for instance, via network 210). The received search queries may be processed by the search engine 220 to identify web-based properties that satisfy the received search queries, for instance, that match terms included in the received search queries. In turn, the search engine 220 may transmit search results that include those web-based properties determined to satisfy the search queries received from the client devices 230. Additionally, the search engine 220 may be configured to query the location database 250 to identify a location for the client device 230 that transmitted a received search query to the search engine 220. Optionally, search engine 220 can also handle specialized search queries, such as queries to find airline flights or hotel availability.

In certain embodiments, the client devices 230 may transmit user activity logs, such as, but not limited to, tool bar logs, to the search engine 220 (e.g., utilizing network 210). The search toolbar 240 is a utility that may be associated with one or more of the client devices 230. In embodiments, the search toolbar 240 may be utilized to log and track the user's visits to web-based properties, may submit the user activity logs having web-based properties visited by the user to the search engine 220 (for instance, utilizing network 210), and may submit an Internet Protocol (IP) address of the client devices 230 to the search engine 220 (again, e.g., utilizing network 210). In certain embodiments, the search toolbar 240 may be a component of the user's web browser that logs browse activity for every web-based property that the user visits. Essentially, the user activity logs identify each web-based property that the user visits, the user's IP address, and/or other browse activity. The user activity logs received from the client devices 230 may be used by the search engine 220 to identify a location associated with a computing device associated with a user, to identify locations for web-based properties, and to impact a rank of web-based properties satisfying user search queries in accordance with analysis performed by the search engine 220.

The location database 250 is a database that stores location data for web-based properties and users, for instance, utilizing the location of a computing device associated with the user. In some embodiments, the location database includes a lookup table having location data and IP address data. For each URL, web-based property, and IP address, the lookup table may include a corresponding location. The location may specify the country, state, city, county, municipality, or any other geographic location identifier for a web-based property having the specified URL. The lookup table may further include entries having an IP address and corresponding location information. For instance, the lookup table may store the URL "www.va.com.au" having IP address 130.194.1.99 that corresponds to a computing device located in Clayton, Victoria, Australia. The location database 250 is configured to receive a user's IP address (that is, an IP address associated with the user's computing device) and/or web-based property URL (e.g., from search engine 220) and return the location for the web-based property or the user based on an IP address and/or URL received.

The query log data database 260 is configured to store activity, such as query-click activity as indicated by the search engine 220. The query-click activity may include records of queries that users issue to the search engine 220, records of the time a query was issued, and records of clicks (selections) a user initiates on search results. Additionally, the query log data database 260 may store the browse activity collected from the search toolbar 240, along with information regarding which user issued the query in the form of a unique identifier such as the IP address of a computing device 230 associated with the user. The toolbar logs from the client devices 230 may also be stored in association with the query log data database 260. As more fully described below, from the query log data database 260, various data sources may be extracted and used in analyses performed by the search engine 220.

Exemplary data sources extracted from query log data database 260 may include session data, session data with locations, query location data and click (selection) data. Session data identifies pairs of queries $[q_1, q_2]$ where users frequently issue $q_2$ within a predefined time period as a follow-up query after issuing the query $q_1$. For instance, a session data entry may indicate that users went from the query "bus" to the query "bus Seattle" in the same session 5,000 times.

Session data with locations couples session data with the locations of the users issuing the session queries. For instance, an entry may indicate that users from Seattle, Wash. (identified based upon, e.g., the IP address of the users' computing devices) went from the query "bus" to the query "bus Seattle" in the same session 1,000 times.

Query location data stores the query, the location from which it was issued, and the number of times it was issued from that location. For example, an entry may indicate that a user issued the query "bus Seattle" from location Seattle, Wash. 10,000 times.

Click (selection) data includes the URLs of the results that users most often selected for particular search queries. For example, an entry may show that for the query "bus Seattle," the most selected URL was "http://transit.metrokc.gov" and the second most selected URL was "http://www.seattle.gov./html/citizen/bus.htm", etc.

As shown in FIG. 2, the search engine 220 is configured with an implicit local service 280. The implicit local service 280 is configured to generate localized URLs for the pair of data items including the received search query and the user's location (identified based upon a computing devices IP address) based on the query log data received from query log data database 260. The implicit local service 280 comprises a query component 282, a term component 284, a query constructor 288, and a lookup file component 286.

The query component 282 is configured to identify queries which are disproportionately popular at particular locations. In this regard, the query component 282 utilizes query location data from the query log data to calculate the probability of a query originating from a particular location. Additionally, the query component 282 may be further configured to utilize the query log data to determine the expected distribution of all queries issued from a particular location. Further, the query component 282 may perform a statistical analysis to determine the Kullback-Leibler (KL) divergence between the observed and expected probabilities of a query originating from a particular location.

In this regard, the query component 282 may be configured to calculate the KL divergence to find queries that are disproportionately popular at a specified location:

$$KL(Q, L) = P(Q, L) \cdot \log\left(\frac{P(Q, L)}{E(L)}\right).$$

Wherein "Q" represents a query, "L" represents a location, "P(Q, L)" represents the probability that a user is entering a query "Q" from location "L," and "E(L)" represents the expected distribution of all queries issued from a location "L." The query component 282 is then configured to analyze the query log data to calculate P(Q, L) and E(L). The query component 282 is configured to utilize the query log data to identify for each query "Q," a location "L" where the query "Q" is highly popular. The query component 282 is then configured to calculate the number of users who issued the query "Q" from each location "L" based on the query log data and location information provided by the location database 250. For example, if the query log data and location information indicates the query "bus Seattle" is issued 8 times from Seattle, Wash. and 2 times from Bellevue, Wash., the value of P(Q=bus seattle, L=Seattle, Wash.) equals 0.8. Furthermore, if 2% of all queries are issued from Seattle, Wash., the E(L=Seattle)=0.02.

In turn, the query component 282, is configured to calculate the following KL divergence value for the query "bus Seattle" from Seattle, Wash.:

$$KL(Q=\text{bus Seattle}, L=\text{Seattle})=0.8*\log(0.8/0.02)=2.95.$$

After evaluating KL("bus Seattle", Seattle) the query component 282 may be configured to compare the KL divergence value to a predefined threshold value, such as 0.25, to determine whether the query is locally biased toward a particular location. A high KL divergence value indicates that the query "bus Seattle" is unusually popular in this location (Seattle, Wash.).

The term component 284 is configured to identify a list of common terms that users in particular locations add to queries when issuing a subsequent query within a predefined time period, such that it appears that the originally input query did not return specific enough results to satisfy the user. In this regard, the term component 284 is configured to analyze 'session data with locations' entries from the query log data to determine the number of times a particular term was added to a query received at a particular location, as identified by the location information provided by the location database 250. In certain embodiments, the term component 284 is configured to determine the number of instances users from location "L" went from a query "Q" to the query "Q+T" or "T+Q" in the same session, where "T" represents a term. For example, the query log data and location information may indicate that users in Seattle, Wash. went from the query "bus" (Q), to the follow-up query "bus Seattle" (Q+T) in the same session 1000 times, where "T" equals "Seattle." The term component 284 may also be configured to determine the total number of times the term "T" was added across all queries in the particular location. For example, the term component 284 may find that the term "Seattle" was added across all queries at location Seattle, Wash. 20,000 times, and the term "free" was added to all queries in Seattle, Wash. 30,000 times.

Additionally, the term component 284 may be configured to perform a statistical analysis using the Kullback-Leibler (KL) divergence technique to identify terms that are added to queries more often in a particular location "L" than other locations. The term component 284 thus may be configured to calculate the KL divergence values for terms commonly added to queries using the same statistical divergence measure described for the query component 282, but with query "Q" replaced with added term "T." Therefore, the term component 284 may determine KL(T,L) for a particular added term at a particular location. After evaluating the KL divergence the query component 282 may compare the KL divergence value to a threshold value, such as 0.25, to determine whether the added term "T" is locally biased toward a particular location. A high KL divergence value indicates that the added term is unusually popular in a particular location. Thus for every location, the term component 284 may determine a list of terms that users commonly add to their queries which are locally biased. Exemplary added terms may include, but are not limited to, terms that describe geographical locations, businesses, tourist attractions, or local areas at or near the user's location. For example, the term component 284 may determine that for location "Seattle, Washington", the locally biased terms which users most commonly add to their queries are: "Seattle", "Washington", "King County", or the like.

The lookup files component 286 is configured to generate various lists that assist in performing embodiments of the invention. One list can be a list of localized URLs associated with a query and user's location (as evidenced by the location of a computing device associated with the user). In this regard, for every query "Q" received by search engine 220 from a user in location "L", the lookup file component 286 is configured to utilize the list of common terms that users in particular locations add to queries from term component 284, to construct a list of enhanced queries ($E_1=Q+T_1$, $E_2=Q+T_2$, $E_3=Q+T_3$) based on the entered query "Q" instance, if the query "bus" is issued from a user in "Seattle, Washington", the lookup file component 286 may be configured to use the output from the term component 284, to construct a list of enhanced queries ($E_1$, $E_{,2}$, $E_3$), for instance, "bus Seattle", "bus Washington", "King County bus", etc. The lookup file component 286 may then be configured to select from the list of enhanced queries, only those enhanced queries which have been issued by users in the past and are locally biased towards the user's location determined using the query component 282. For instance, the lookup file component 286 may determine that queries "bus Seattle" and "King County bus" are the enhanced queries which have been issued by users in the past, as indicated by the query log data, and are thus locally biased towards Seattle, Wash.

The lookup file component 286 can be further configured to use click data from the query log data to determine the most clicked on or selected URLs for each of the selected enhanced queries. Additionally, the lookup file component 286 may be configured to rank the URLs by any convenient method. In an embodiment, the search engine 220 may be configured to use the lookup file generated by the lookup file component 286 to extract the top localized URLs for a query and present the localized URLs merged with regular search results, that is, search results determined without regard to the user's location, in association with the client devices 230.

In an embodiment, the lookup file component can also construct and/or manage other lists. Such lists can include the geographic entity lists described above for use in constructing related searches, the deeplink lists described above, or any of the other lists described above.

Query constructor 288 can be used to construct the various additional queries described above. This can include the additional queries for the related searches/query suggestions, the additional queries used to determine additional deeplinks, or the specialized queries needed for embodiments such as the location aware travel answer.

One of ordinary skill in the art understands and appreciates the computing environment 200 has been simplified for description purposes and alternate operating environments are within the scope and spirit of the above description.

Figure 3:
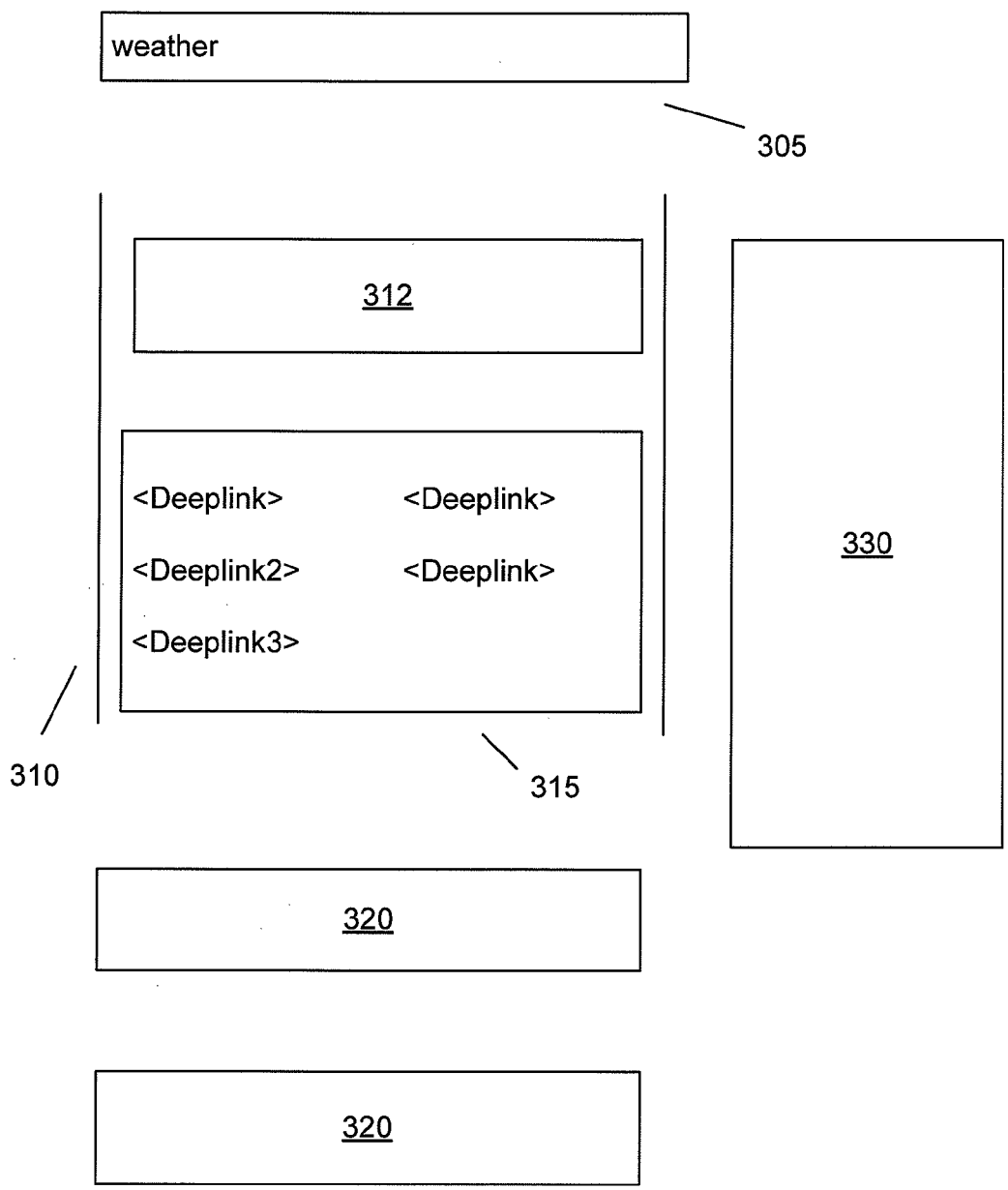
FIG. 3 schematically shows an example of a search results page.

FIG. 3 schematically shows an example of a search results page. In FIG. 3, a query box 305 is provided. In the embodiment shown in FIG. 3, the query box is populated with the prior query of "weather" that was submitted by the user. The other items shown on the search results page in FIG. 3 represent hypothetical results provided in response to this query. Area 310 represents an area for presenting the top matching search result 312, including deeplinks 315 corresponding to top result 312. Additional details regarding the potential content of an area 310 are shown in FIGS. 4a and 4b. Areas 320 show additional links responsive to the query. Area 330 corresponds to related searches or suggested queries. Additional details regarding the potential content of area 330 are shown in FIGS. 5a and 5b.

FIGS. 4a and 4b schematically show a portion of a search results page as an example of the impact of locality based deeplinks on a results page displayed to a user. The portion of the search results page includes only the query box and a search result that has various deeplinks. In FIG. 4a, a hypothetical search result 412 for the query "weather" 405 is shown. In this example, the user's local context is assumed to be Carlsbad, Calif. Because the search result 412 was identified as a deeplink match for the query, deeplinks 442 and 444 are provided. Deeplinks 442 are deeplinks that are unrelated to geography. Deeplink 444 is a deeplink related to a geographical entity. In this case, due to prior history of people selecting New York City weather after an initial query for weather, the url corresponding to "NYC weather" is shown as deeplink 444.

FIG. 4b shows a modified set of deeplinks according to an embodiment of the invention. For FIG. 4b, it is assumed that the locality of the user submitting the query is Carlsbad, Calif. In FIG. 4b, deeplink 444 is not displayed, as weather in New York City is a location based deeplink that is not related to the user's location. Deeplinks 446 and 447 have been added, corresponding to "weather Carlsbad, CA" and "weather San Diego" respectively. Deeplink 446 corresponds to a deeplink constructed based on the user's local context, while deeplink 447 corresponds to a deeplink constructed based on a neighbor geographic entity.

Figures 5A, 5B:
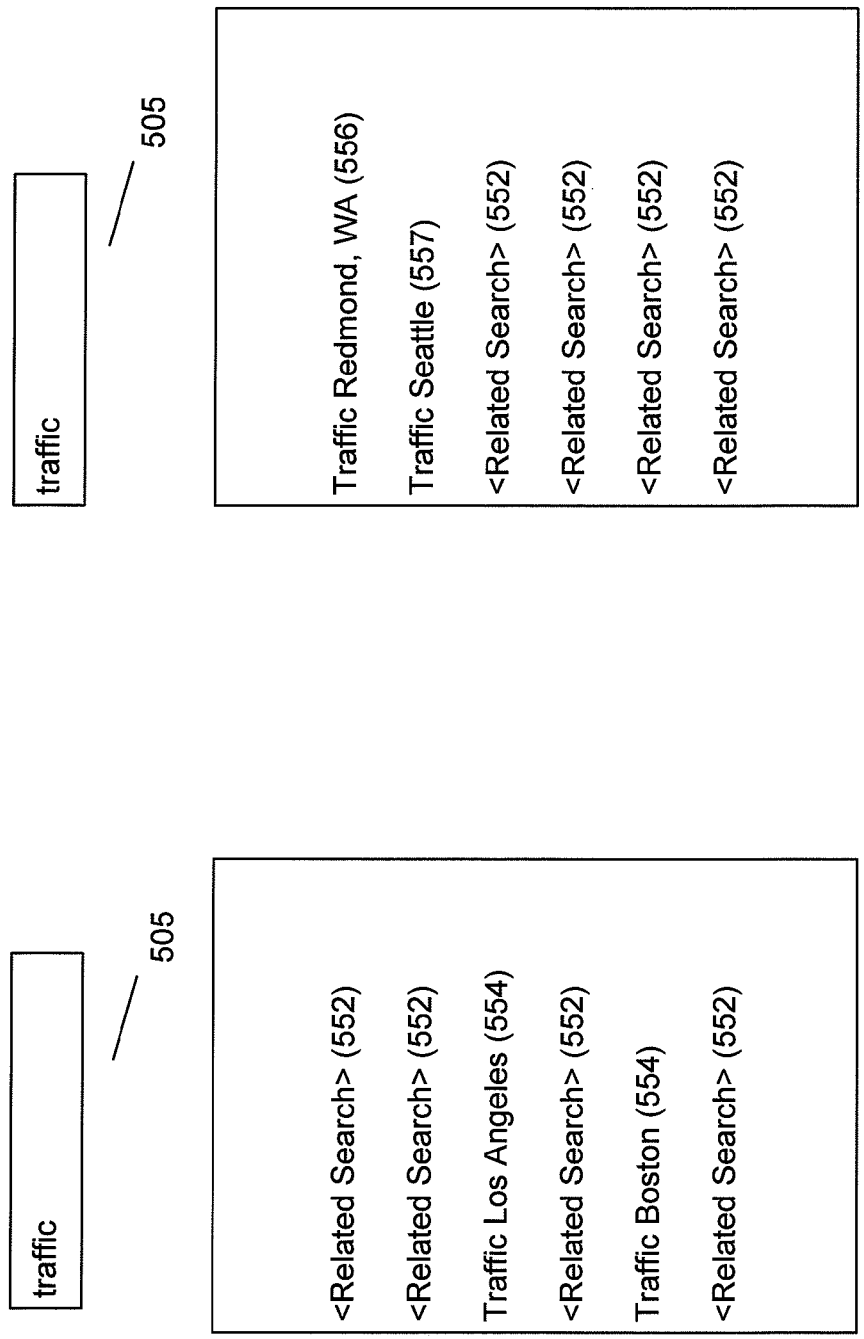
FIGS. 5a and 5b schematically show portions of a search results page.

FIGS. 5a and 5b schematically show a portion of a search results page as an example of the impact of locality based query suggestions on a results page displayed to a user. The portion of the search results page includes only the query box and the related searchs or query suggestions. For FIGS. 5a and 5b, the user's local context is Redmond, Wash. In FIG. 5a, a hypothetical related search display area 530 is shown for a query 505 of "traffic". The related searches include non-geographic related searches 552 and geographic related searches 554. The geographic related searches 554 include "traffic Boston" and "traffic Los Angeles."

In FIG. 5b, the searches related to Boston and Los Angeles are removed. Instead, related searches corresponding to "traffic Redmond" 556 and "traffic Seattle" 557 are displayed. Related search 556 corresponds to a query constructed from the original search plus the user's local context, while related search 557 corresponds to a query constructed from the original search plus a neighbor geographic entity. Note that related searches 556 and 557 are shown at the top of the query suggestions list in FIG. 5b. In other embodiments, the constructed query suggestions can be included on the results page in any convenient manner, including in a separate area from the other related searches and/or query suggestions.

Figure 6:
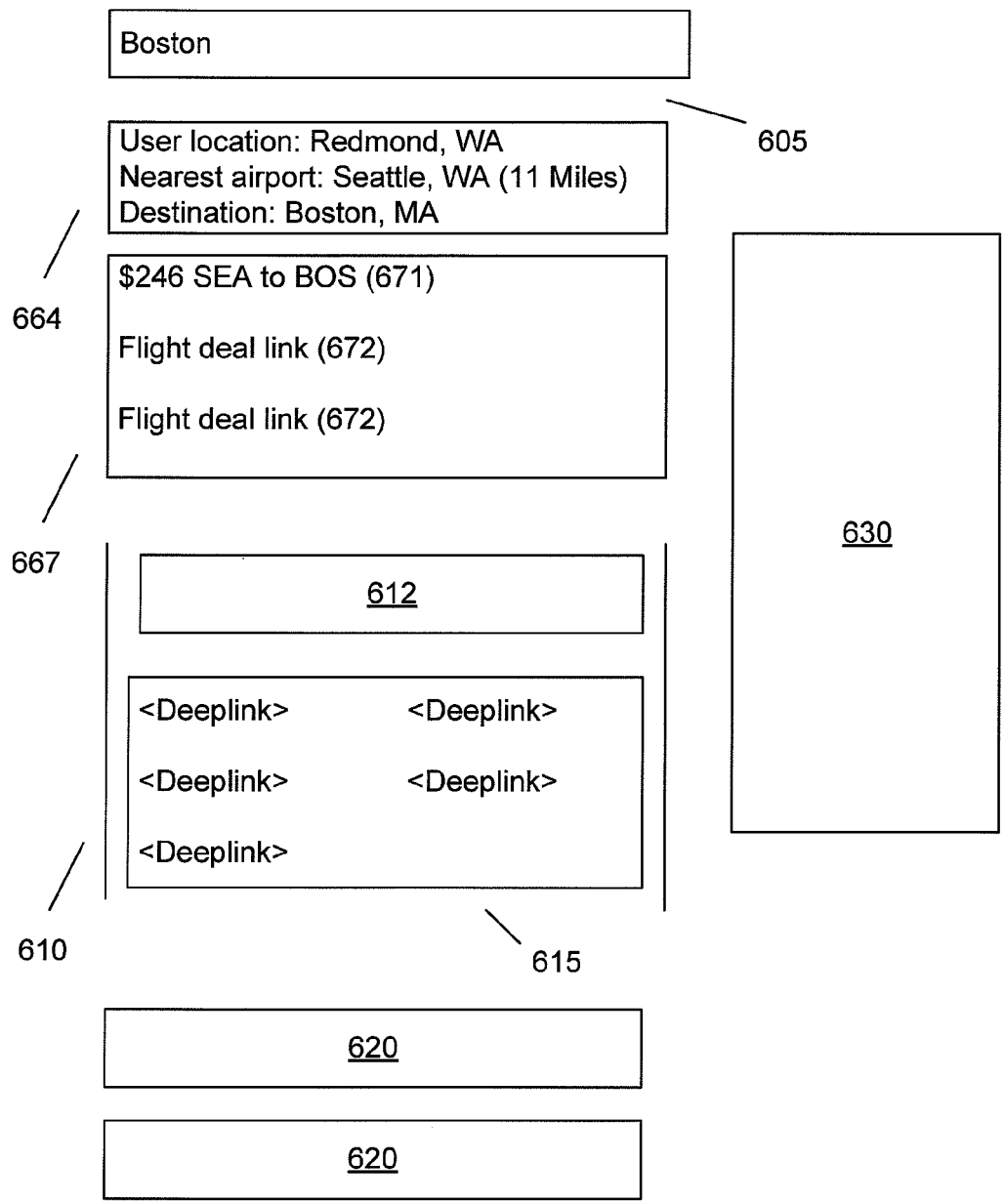
FIG. 6 schematically shows an example of a search results page.

FIG. 6 schematically shows an example of another search results page that includes a travel result. The local context for the example in FIG. 6 is assumed to be Redmond, Wash. In the embodiment shown in FIG. 6, query box 605 shows a previously submitted search of "Boston". The results page includes a related searches box 630 showing various additional searches for Boston. The results page also includes top result area 610, including top result 612 and deeplinks 615, as well as other matching links 620. Above the top result area 610 is a travel result area. The travel result area includes an information area 664 showing the information used for the travel search. In the embodiment shown in FIG. 6, this includes the current user local context, the distance to the nearest travel hub, and the destination location from the original query. The travel result area also includes flight options area 667. Fight options area 667 includes several links, including one link 671 showing a selected fare, and other links 672 to various potential flight deals.

Figure 7:
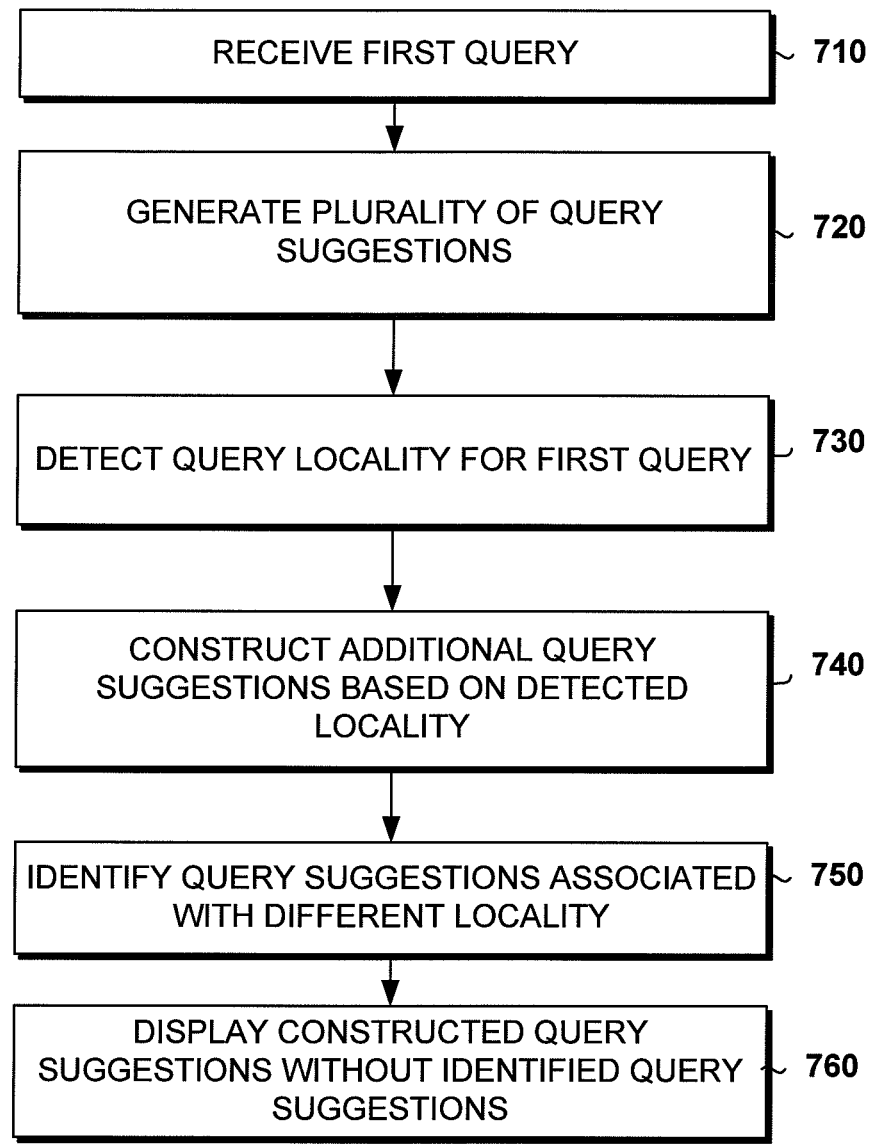
FIG. 7 depicts a flow chart of a method according to an embodiment of the invention.

FIG. 7 shows a flow chart for a method according to an embodiment of the invention. In the embodiment shown in FIG. 7, a first query is received 710. A plurality of query suggestions are generated 720. A query locality for the first query is detected 730. Note that the plurality of query suggestions can be generated before or after detecting the query locality. Additional query suggestions are then constructed 740 based on the detected locality. Also, the plurality of query suggestions can be analyzed to identify query suggestions 750 that are associated with a locality different from the query locality. The constructed query suggestions are then displayed 760 without displaying the identified query suggestions.

Figure 8:
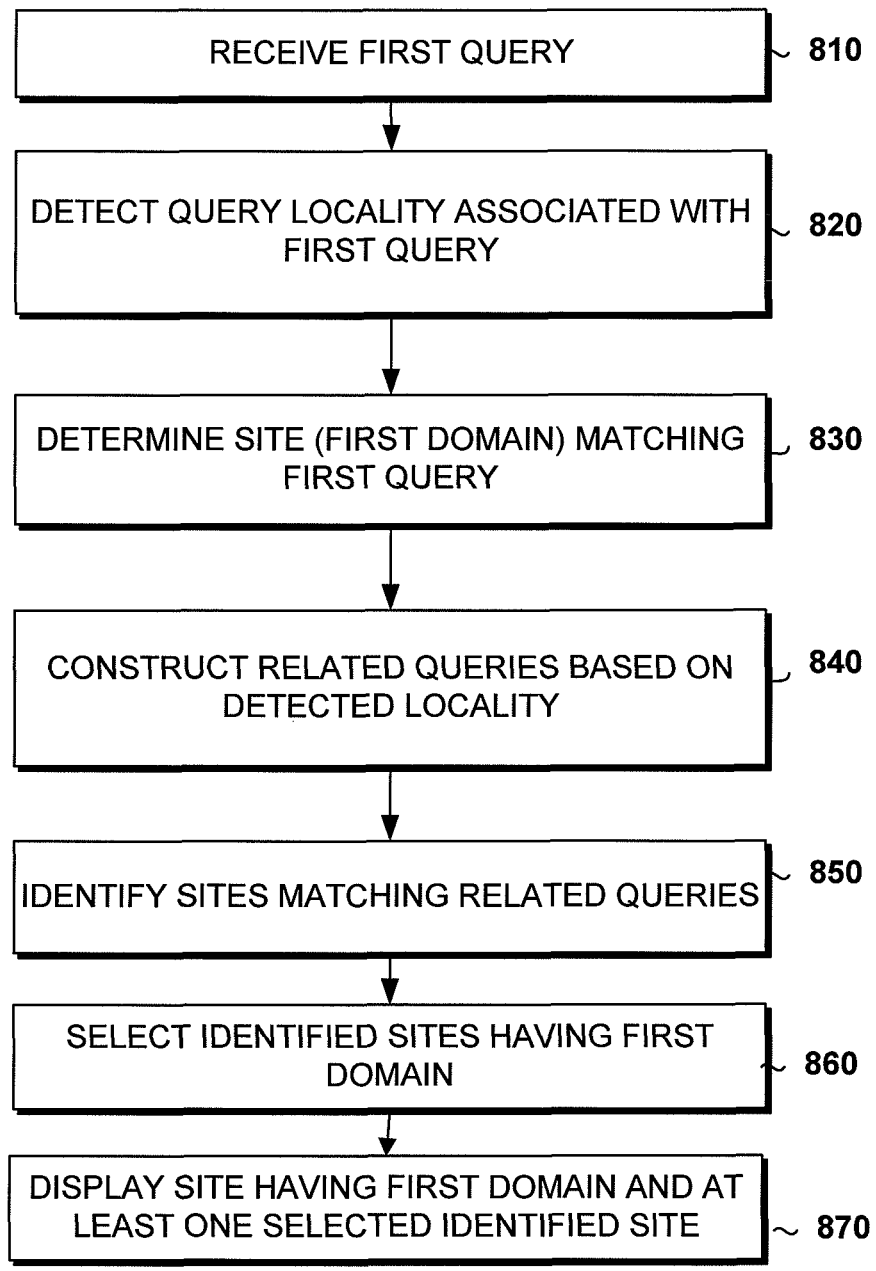
FIG. 8 depicts a flow chart of a method according to an embodiment of the invention.

FIG. 8 shows a flow chart for a method according to another embodiment of the invention. In FIG. 8, a first query is received 810. A query locality associated with the first query is detected 820. At least one site matching the first query is determined 830, wherein the site has a first domain. Related queries are constructed 840 based on the detected locality. Additional sites can be identified that match 850 one or more of the related queries. From these identified matches, sites are selected 860 that have the first domain. The site having the first domain and at least one selected identified are then displayed 870.

Figure 9:
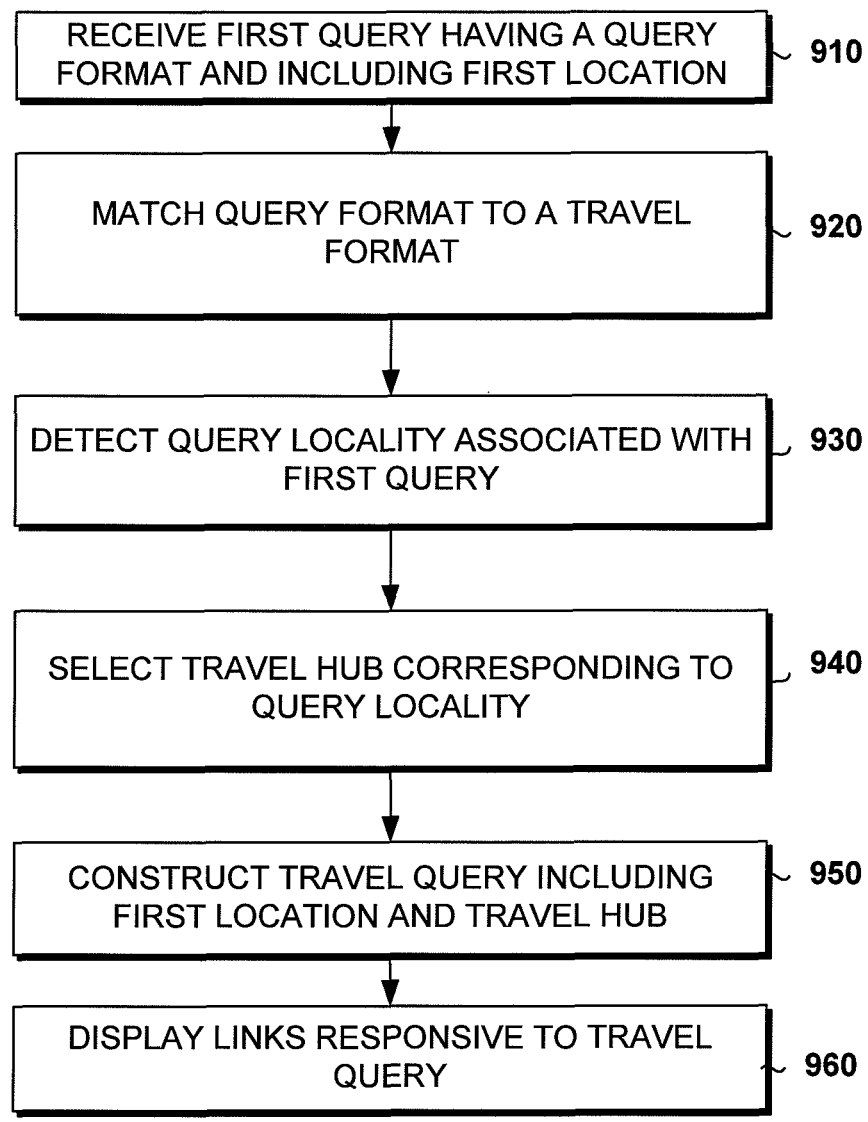
FIG. 9 depicts a flow chart of a method according to an embodiment of the invention.

FIG. 9 shows a flow chart for a method according to still another embodiment of the invention. In FIG. 9, a first query is received 910, the first query having a query format and including a first location. The query format of the first query is then matched 920 to a travel format. A query locality is also detected 930 that is associated with the first query. A travel hub is selected 940 that corresponds to the query locality. A travel query is then constructed 950 that includes the first location and the travel hub. Links responsive to the travel query are then displayed 960.

Additional Embodiments

In an embodiment, one or more tangible computer-storage media storing computer-useable instructions are provided that, when executed by a computing device, perform a method for providing location aware query suggestions. The method includes receiving a first query. A plurality of query suggestions are generated based on the first query. A query locality is detected that is associated with the first query. One or more additional query suggestions are constructed based on the detected locality. At least one query suggestion from the plurality of query suggestions is identified that is associated with a second locality different from the detected locality. The constructed additional query suggestions are then displayed without displaying the identified query suggestions.

In another embodiment, a method of displaying deeplinks associated with a search result is provided. The method includes receiving a first query. A query locality associated with the first query is detected. At least one site matching the first query is determined, the site having a first domain. At least one related query is constructed based on the detected locality. One or more sites matching the at least one related query are identified, and identified sites that correspond to the first domain are selected. The site having the first domain and at least one of the selected identified sites is then displayed.

In yet another embodiment, a method for performing a locality based travel search is provided. The method includes receiving a first query that includes a first location and has a query format. The query format is matched to a travel format. A query locality associated with the first query is detected. A travel hub is selected corresponding to the query locality. A travel query including the first location and the travel hub is then constructed. At least one document link responsive to the travel query is displayed.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. One or more computer-storage memory media storing computer-useable instructions that, when executed by a computing device, perform a method for providing location aware query suggestions, the method comprising:
   receiving a first query;
   generating a first plurality of query suggestions based on the first query;
   detecting a query locality associated with the first query;
   constructing one or more additional query suggestions based on a geographic entity associated with the detected query locality, the associated geographic entity corresponding to a geographic designation;
   wherein constructing one or more additional query suggestions comprises:
   determining neighbor geographic entities for the geographic entity associated with the detected query locality;
   constructing a query suggestion corresponding to each neighbor geographic entity based on the first query and the neighbor geographic entity;
   identifying at least one query suggestion, from the first plurality of query suggestions, associated with a second geographic entity different from the geographic entity associated with the detected query locality; and
   displaying the constructed additional query suggestions without displaying the identified query suggestions.

2. The one or more computer-storage memory media of claim 1, wherein the method further comprises displaying at least one query suggestion from the plurality of query suggestions without displaying the identified query suggestions.

3. The one or more computer-storage memory media of claim 1, wherein the detected locality corresponds to the geographic entity associated with the detected query locality.

4. The one or more computer-storage memory media of claim 1, wherein the detected query locality corresponds to a latitude and a longitude.

5. The one or more computer-storage memory media of claim 1, wherein determining neighbor geographic entities comprises retrieving the neighbor geographic entities from a lookup table.

6. The one or more computer-storage memory media of claim 1, wherein identifying the at least one query suggestion corresponding to a second geographic entity comprises:
   detecting a query term corresponding to a geographic entity in at least one query suggestion; and
   comparing the detected query term with neighbor geographic entities for the geographic entity associated with the detected query locality.

7. The one or more computer-storage memory media of claim 1, wherein constructing one or more additional query suggestions comprises constructing a query suggestion based on the first query and the geographic entity associated with the detected query locality.

8. The one or more computer-storage memory media of claim 1, wherein each identified query suggestion associated with a geographic entity different from the geographic entity associated with the detected query locality is not associated with a neighbor geographic entity of the geographic entity associated with the detected query locality.

* * * * *